Patented Aug. 29, 1950

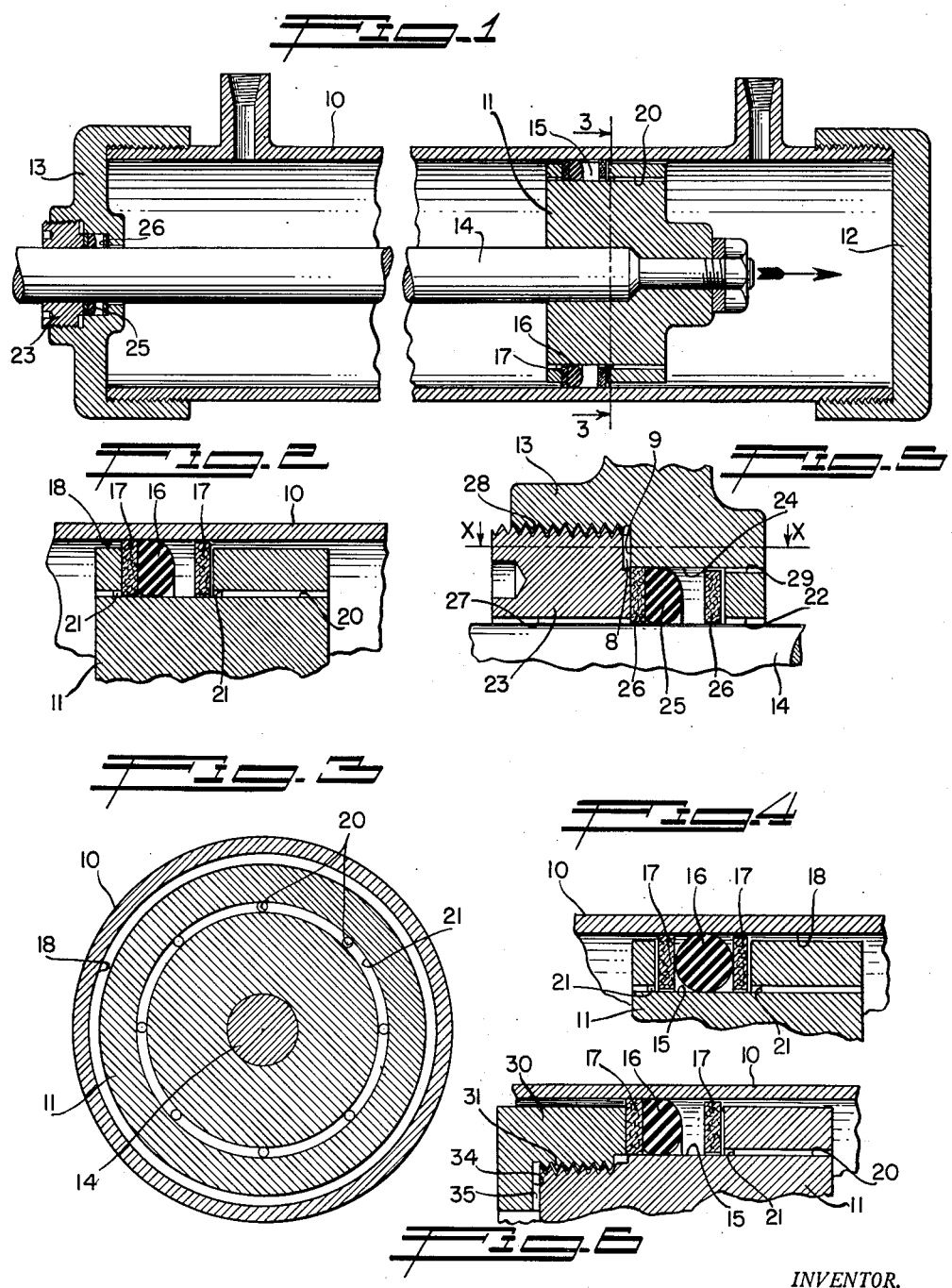

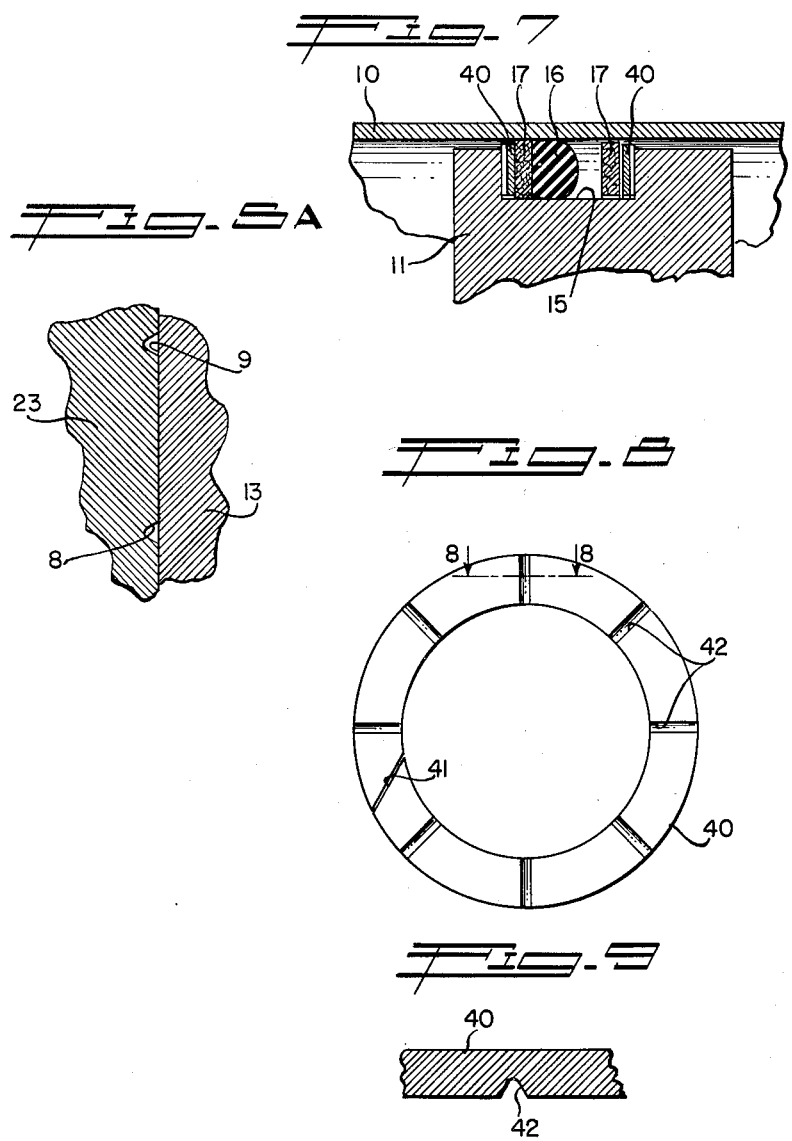

2,520,306

UNITED STATES PATENT OFFICE 2,520,306

PRESSURE BALANCED PACKING

James I. Detweiler, Burbank, Calif., assignor to Lockheed Aircraft Corporation, Burbank, Calif.

Application February 13, 1947, Serial No. 728,364

3 Claims. (Cl. 309—23)

This invention relates to sealing or packing means and relates more particularly to packings for preventing the leakage of fluid under pressure from between two or more members.

In recent years, the so-called O ring packing has gone into extensive use in situations where it is desired to prevent leakage of fluid between relatively movable members as well as between stationary members. A typical O ring packing installation comprises a ring of circular cross section formed of rubber or synthetic rubber arranged in an annular groove in one member to engage and seal with the other member.

The fluid pressure acts on the ring to force it into contact with the walls of the groove and the surface of the companion member to provide an effective fluid-tight seal between the two members. Where the fluid is handled under high pressures the material of the O ring is forced or extruded into the essential clearance space between the members. The extruded portions of the packing material are soon cut and worn away and leakage ultimately occurs in the seal. To prevent this extrusion effect back-up rings of leather or the like have been arranged between the O ring and the radial or end walls of the groove. The back-up rings are distorted or expanded radially by the pressures imposed upon them by the O ring and the fluid and thus close the clearance space at the mouth of the groove to prevent the extrusion of the O ring material. However, it has been found that where high pressures are present the back-up rings often assume the sealing function and the material of the back-up rings is extruded into the clearance space and is soon cut and worn away.

The extrusion of the O ring material or the material of the back-up ring into the clearance space between the relatively movable members results, at least to a large extent, from the unbalanced pressure conditions in the groove which contains the packing rings. The unbalanced pressures tend to excessively distort the rings and crowd them toward the clearance space so that the material of the O ring or the back-up ring, as the case may be, is caused to bulge or distort in a thin section into the clearance space where it wears and disintegrates.

It is a general object of this invention to provide an O ring sealing arrangement of the general class referred to above wherein the fluid pressures on the sealing ring or the sealing ring and the back-up ring are substantially balanced to eliminate or reduce the extrusion and wearing of the rings. The present invention provides a system of pressure paths leading to the ring containing groove to provide a generally or partially balanced pressure condition in the groove so that the pressures acting upon the side of the sealing ring or ring assembly at its inner and outer peripheral portions are substantially balanced. This reduces distortion of the sealing ring or ring assembly and eliminates or lessens the extrusion of the material of the ring.

In addition to the extrusion of the sealing ring or back-up ring material, as discussed above, it has been found that where high fluid pressures are present there is sometimes leakage between the members of the packing assembly which results in erosion and wear of the rings.

It is another object of this invention to provide a packing means of the character referred to which avoids or eliminates the leakage of high pressure fluid between the contacting surfaces of the O ring and back-up ring and between the end wall of the groove and the sealing ring or back-up ring, as the case may be. The flow path or leakage path system of the invention substantially balances the pressures at the inner and outer peripheral zones of the sealing ring or sealing ring assembly and there is little or no radial leakage of fluid to cause erosion of the rings.

Another object of the invention is to provide a pressure balanced packing means of the class referred to applicable in situations where the O ring is employed alone and without back-up rings as well as in cases where back-up rings are used. In both of the instances just named the pressure balancing system serves to substantially eliminate extrusion of the ring which bears against the end wall of the recess or packing containing groove.

A further object of the invention is to provide sealing means of the class referred to that are capable of embodiment in or application to pistons, rams, plungers, and other reciprocating elements, packing glands and in assemblies where it is desired to seal between relatively rotating parts.

Other objects and features of the invention will be readily understood from the following detailed description of typical preferred forms of the invention wherein reference will be made to the accompanying drawings in which:

Figure 1 is a longitudinal sectional view of a cylinder and piston mechanism embodying packing means of the invention;

Figure 2 is an enlarged fragmentary sectional view of the cylinder and piston illustrating the piston packing;

Figure 3 is an enlarged transverse sectional view taken as indicated by line 3—3 on Figure 1;

Figure 4 is a view similar to Figure 2 showing the packing parts in the idle positions;

Figure 5 is an enlarged fragmentary sectional view illustrating the packing gland and the piston rod;

Figure 5A is a fragmentary sectional view taken as indicated by line X—X on Figure 5;

Figure 6 is a view similar to Figure 2 showing a slightly modified form of the invention;

Figure 7 is a view similar to Figure 2 showing still another embodiment;

Figure 8 is an enlarged end view of the pressure balancing ring embodied in the device of Figure 7; and Figure 9 is an enlarged fragmentary sectional view taken as indicated by line 9—9 of Figure 8.

The packing means of the present invention has many applications and is useful in practically all situations where a fluid seal is to be provided between machine or structural parts. In the drawings I have illustrated several typical forms and applications, it being understood that these are primarily illustrative and are not intended to be restrictive of either the scope or utility of the invention.

In Figures 1 to 5 I have illustrated the invention incorporated in a cylinder and piston mechanism having a cylinder 10 and a piston 11 reciprocable in the cylinder. A head 12 closes one end of the cylinder and the head 13 at the other end of the cylinder carries a packing gland for sealing about the piston rod 14. This packing gland, which is illustrated in detail in Figure 5, is constructed in accordance with the invention and will be subsequently described in detail. The piston 11 is shown as constituting a one-piece member suitably attached to the piston rod 14. In accordance with the invention an annular groove 15 is provided in the periphery of the piston to contain the packing means. The groove 15 is of uniform configuration and dimensions throughout its circumference and in the preferred construction has a cylindrically curved inner or bottom wall concentric with the axis of the piston. The end walls of the groove 15 are preferably normal to the longitudinal axis of the piston, it being understood that the configuration of the groove may be varied somewhat without departing from the invention.

The sealing or packing means for the piston includes, what is generally termed, an O ring 16. The ring 16 is a continuous, unbroken annular member of rubber or synthetic rubber possessing considerable flexibility and elasticity. As shown in Figure 4, the O ring is cylindrical or circular in cross section when undistorted by fluid pressures. It is preferred to proportion the parts so that the O ring 16 is compressed to some extent between the bottom wall of the groove 15 and the internal surface of the cylinder 10. That is, the distance between the bottom wall of the groove 15 and the surface of the cylinder 10 is slightly less than the normal diameter of a cross section of the O ring. This assures effective sealing engagement of the ring with the cylinder wall and the surfaces of the groove 15. While I have shown a sealing ring of circular cross section, it is to be understood that the invention may be embodied in packing means having sealing rings of other configurations.

The packing means also includes back-up rings 17 for preventing extrusion of the material of the O ring 16 into the tolerance space or clearance space 18 between the periphery of the piston 11 and the internal surface of the cylinder 10. The clearance space 18 as it appears in the drawings may be considered as exaggerated for the sake of clarity. There is a back-up ring 17 arranged in the groove 15 at each side of the O ring. The back-up rings 17 are annular members of rectangular cross section arranged to have their inner peripheral surfaces at the bottom wall of the groove 15 and the outer peripheral surfaces at the internal face of the cylinder 10. When the parts are in the idle or inactive positions the back-up rings 17 are in spaced parallel planes at the opposite sides of the O ring. The backing rings are formed of a somewhat flexible material and are pliant and compressible to conform with the end walls of the groove 15. The backing rings are compressed axially to expand radially when the assembly is subjected to high fluid pressures. It is desirable to construct the rings 17 of a material which has the required flexibility and compressibility and yet has substantial strength to resist failure and separation. It has been found practical to construct the rings 17 of chrome tanned leather having low grease and salt content. It is to be understood, however, that the rings 17 may be formed of other leathers or materials such as rubber or synthetic rubber having the desired physical characteristics. When the back-up rings are formed of leather the best results are obtained by arranging the rings with their grain sides facing the O ring 16.

With the packing assembly of Figures 1, 2 and 4 under pressure, as when the piston 11 is operated in the cylinder 10, the fluid pressure entering the groove 15 from the high pressure side of the piston crowds or forces the O ring 16 against one of the backing rings 17. The pressure forces the back-up ring 17 against the adjacent end wall of the groove 15 and subjects the back-up ring to axial compression. This axial compression is accompanied by radial expansion of the backing ring and its periphery is brought into effective engagement with the cylinder wall. The radially expanded back-up ring 17 engaging the internal surface of the cylinder 10 prevents extrusion of the sealing ring 16 into the annular clearance space 18. However, it has been found that where high pressures are developed in the cylinder 10, for example pressures in the order of 3000 p. s. i., the material of the compressed and radially expanded back-up ring 17 extrudes into the clearance space 18. This results in cutting and premature wear of the back-up ring. In installations where the back-up rings 17 are omitted the material of the O ring 16 extrudes into the clearance space 18, under such conditions of operation, and the O ring rapidly wears or becomes cut.

It has been found that if the packing containing groove 15 and the rings 16 and 17 contained therein are related and proportioned to leave the backing rings 17 unconfined and with appreciable freedom of axial movement, the backing rings will roll during operation of the piston; that is, they will turn about the central axes of their cross sections at one or more points to the extent that their outer peripheries swing inwardly more than 90° and their inner peripheries will swing outwardly more than 90°. This renders the backing rings 17 inoperative and may cause malfunctioning and failure of the sealing ring 16. Accordingly, the groove 15 and the rings 16 and 17 of the invention are proportioned and related so that the backing rings 17 are at all times confined between the end walls of the groove 15 and the sealing ring 16 to the extent that they are prevented from rolling. This relationship of the parts will be clearly apparent from an inspection of Figures 2 and 4. It will be observed in Figure 4, which shows the parts in the idle state, that the backing rings 17 lie against the undistorted sealing ring 16 and at the same time substantially engage the end walls of the groove 15.

The present invention provides a system of paths or channels for substantially equalizing the pressures at the inner and outer peripheral portions of the back-up rings to prevent or reduce the tendency for the rings to extrude at the clearance space 18.

In the form of the invention embodied in the piston packing of Figures 1 to 4 inclusive, the pressure balancing system includes a series of circumferentially spaced axial ports 20 leading from each end face of the piston 11 to the adjacent end of the groove 15. Relative shallow annular grooves 21 are formed at the lines of juncture of the end and bottom walls of the groove 15 and the inner ends of the ports 20 communicate with these grooves. The grooves 21 serve to connect the several ports 20 of each port series to give a distributed pressure effect. It is preferred to make the aggregate capacity of a series of ports 20 somewhat less than the capacity of the annular clearance space 18 so that the pressure differentials at the inner and outer peripheral zones of the sealing ring assemblies are not truly balanced.

In the operation of the piston packing of Figures 1 to 4 inclusive, it will be assumed that the piston 11 is moving in the direction indicated by the arrow of Figure 1 so that high pressure at the right hand side of the piston enters the groove 15 through the clearance space 18 and the ports 20 leading to the right hand end of the groove. The ports 20 leading from the left end of the groove 15 and the clearance space 18 at the left side of the groove form leakage paths or pressure relief ducts so that the inner and outer peripheral portions of the O ring 16 and the back-up ring 17 are subjected to substantially equal or balanced pressure differential conditions. As a result of this substantial balancing of the pressure differentials at the inner and outer areas of the sealing ring assembly the distorted O ring 16 is believed to assume a configuration substantially as illustrated in Figures 1 and 2 and the back-up ring 17 is compressed axially to expand radially against the cylinder wall. The balancing of the pressure differentials reduces the tendency for the back-up ring 17 to extrude into the clearance space 18. It has been found that the pressure balance obtained by the ports 20 and grooves 21 reduces the tendency for the O ring 16 and back-up ring 17 to crowd into the outer peripheral corner of the groove 15 and therefore eliminates or reduces extrusion of the sealing ring assembly into the space 18. Furthermore, there is no high pressure leakage of fluid between the contacting surfaces of the O ring 16 and back-up ring 17 in the radial direction and there is no erosion of the rings as a result of such leakage. The high pressure ports 20, that is the ports 20 communicating with the high pressure end of the cylinder 10 may assist in balancing the pressures imposed on the O ring 16. Upon reversal of the piston 11 the O ring 16 moves to the other end of the groove 15 and is forced against the back-up ring 17 in the right hand end of the groove. The sealing action and the extrusion preventing action during movement of the piston 11 to the left are the same as described above.

The invention is adapted for embodiment in packing glands for sealing about reciprocating members. Figures 1 and 5 illustrate such a gland. The cylinder head 13 has a bore 22 for receiving the piston rod 14 and the bore is enlarged in diameter from its outer end to receive an annular follower or ring 23. The inner end of the follower ring 23 is spaced from the bottom or inner wall of the enlargement to leave an annular groove 24 for the packing ring assembly. An O ring 25, similar to the ring 16, is arranged in the groove 24 and is proportioned to be slightly compressed between the rod 14 and the outer wall of the groove 24 when in the idle or normal condition. If desired, the O ring 25 may form the sole sealing member of the gland. However, in the drawings I have shown back-up rings 26 arranged against each end wall of the groove 24. The rings 26 may be the same in construction as the rings 17 described above. The follower or ring 23 surrounds the piston rod 14 with clearance leaving an annular clearance space 27.

The gland of Figures 1 and 5 includes means for substantially balancing the pressure differentials at the low pressure side of the packing means to prevent or reduce extrusion of the back-up ring 26 into the clearance space 27. In the construction illustrated, the nut or ring 23 is screw threaded into the cylinder head 13 and the threads 28 form or provide a pressure leakage path or at least a portion of the leakage path. This path communicates with the other peripheral portion of the groove 24. Threads 28 of normal or usual formation will ordinarily provide a sufficient leakage path. If found necessary or desirable, the threads 28 may be specially formed or cut to increase the capacity of the flow path. The inner end of the ring 23 engages a shoulder 9 on the head 13 to limit the inward threading of the ring and thus determine the width of the groove 24. I provide a leakage path at the shoulder 9 to place the groove 24 in communication with the leakage path at the threads 28. This may be provided by forming channels 8 or the equivalent at the shoulder 9 or in the end of the ring 23 or both. I have shown spaced radial channels 8 in the end of the ring 23 to connect the leakage path at threads with the outer peripheral corner portion of the packing groove 24. In view of the fact that the outer side or left hand side of the groove 24 as viewed in Figure 5 always remains a low pressure area it may be found unnecessary to provide a high pressure balancing means at the inner or right side of the groove. However, in Figure 5, I have shown ports 29 leading from the interior of the cylinder 10 to the inner side of the groove 24 and these ports may assist in balancing the pressures imposed on the O ring 25.

The operation of the packing gland illustrated in Figure 5 is substantially the same as with the piston packing described above. When high pressures are developed in the left hand end of the cylinder 10 they are transmitted to the groove 24 and force the O ring 25 against the back-up ring 26. This brings the O ring into effective sealing engagement with the piston rod 14 and compresses the back-up ring 26 against the ring 23. Compression of the back-up ring 26 expands it radially inward against the piston rod 14. When in this condition the back-up ring 26 prevents material of the O ring 25 from extruding into the clearance space 27. The low pressure leakage path provided by the screw threads 28 maintains substantially balanced pressure differential conditions at the inner and outer peripheral zones of the back-up ring 26. This pressure balancing reduces or eliminates the tendency for the material of the back-up ring from extruding into the clearance space 27.

It will be observed that the piston 11 of Figure 1 is a one-piece member. When this construction is employed the groove 15 is preferably in spaced adjacent relation to one end of the piston so that the rings 16 and 17 may be first entered in the groove at one side of the piston and then sprung over the end of the piston to fully seat in the groove. Instead of employing a one-piece piston the piston may have a threaded-on nut at one end of the groove 15 which may be removed to permit installation of the packing rings. This construction is illustrated in Figure 6 where 30 designates the threaded nut. In this case the above described ports 28 communicate with one end of the groove 15 and the threads 31 at the nut 30 provide a portion of the low pressure leakage path to the other end of the groove. The outer end of the nut 30 is enlarged, being provided with an inturned flange which presents a shoulder 34 for engaging the end of the piston body to limit the inward threading of the nut. A leakage path is provided between the engaging surfaces of the nut 30 and the piston body 11. I have shown substantially radial grooves 35 in the surface or shoulder 34 to form the low pressure leakage path which, together with the leakage path at the threads 31, maintains the pressure differential at the inner peripheral portion of the ring 17 substantially equal to the pressure differential at the outer peripheral part of the packing ring. It will be readily understood that similar grooves may be formed in the end of the piston body to constitute or amplify the leakage path at the shoulder 34. The operation of the assembly illustrated in Figure 6 is the same as that of Figures 1 to 4 inclusive.

Figures 7, 8 and 9 illustrate still another form of the invention. In this case the piston may be constructed as in Figure 1 to have an annular peripheral groove 15. Further, the O ring 16 and the back-up rings 17 may be the same as above described. The sealing means of Figures 7, 8 and 9 is characterized by pressure balancing rings 40. There is a balancing ring 40 arranged in the groove 15 between each back-up ring 17 and the adjacent end wall of the groove. The rings 40 are constructed of steel or other substantially unyielding material and may be rectangular in cross section. The internal diameter of the rings 40 is larger than the diameter of the inner wall of the groove 15 and the external diameter of the rings is less than the internal diameter of the cylinder 10. Where a one-piece piston is used each ring 40 is preferably split as shown at 41 so that it may be sprung into the groove 15. In accordance with the invention radial leakage or low pressure channels are provided between the end walls of the groove 15 and the opposing surfaces of the rings 40. These may be obtained by making grooves, serrations or irregularities in the walls of the groove or in the faces of the rings 40, or in both the groove walls and rings. In the drawings I have shown the rings 40 provided with angularly spaced radially extending grooves 42 which oppose the end walls of the space or groove 15. The grooves 42 are relatively shallow and narrow but are sufficient in number and capacity to substantially balance the low pressures at the inner and outer peripheral areas of the back-up rings 17.

The operation of the structure illustrated in Figures 7, 8 and 9 is similar to the devices of the other figures. Assuming the parts to be in the position shown in Figure 7, the high cylinder pressure urges the O ring 16 to the left so that the back-up ring 17 is compressed against the pressure balancing ring 40. This results in radial expansion of the back-up ring to prevent extrusion of the O ring. The grooves 42 in the balancing ring 40 form low pressure paths which expose the inner peripheral portion of the back-up ring and O ring 16 to approximately the same low pressure that exists in the outer periphery of the assembly. As a consequence, the tendency for the O ring to crowd into the outer corner of the groove 15 is reduced or eliminated, and the tendency for the back-up ring to extrude into the clearance space 18 is eliminated. When the piston 11 reverses, the O ring 16 moves to the other end of the groove 24. This relieves the pressure on the back-up ring 17 at the left side of the groove and the adjacent balancing ring 40 is free of pressure. The grooves 42 in the ring 40 are thus free and open to be cleared of any obstructing foreign material that may have been trapped in them. From this it will be seen that the pressure balancing means of Figures 7, 8 and 9 are automatically cleared upon each reversal of the piston.

It will be observed that in each of the several forms of the invention the backing rings are substantially confined as described in connection with the structure of Figures 1 to 4 inclusive so that they are prevented from rolling during operation.

Having described only typical forms of the invention, I do not wish to be limited to the specific details herein set forth, but wish to reserve to myself any variations or modifications that may appear to those skilled in the art and fall within the scope of the following claims.

I claim:

1. Packing means for sealing between two members arranged one within the other with a working clearance space therebetween, one of said members having an annular groove presenting a wall at one of its ends, the packing means comprising a flexible sealing ring of substantially circular cross section arranged in said groove to seal with the other member, a backing ring of compressible material arranged in the groove between the sealing ring and said wall, the backing ring being adapted to be compressed axially by the sealing ring when the latter is crowded against it by fluid pressure entering the other end of the groove, and leakage path means for maintaining the fluid pressure in the portion of said groove adjacent the inner periphery of said wall in substantially balanced relation to the fluid pressure at the juncture of said wall and said clearance space to prevent extrusion of the backing ring into said clearance space, said means including a ring interposed between said backing ring and said wall and together with said wall defining at least one passage for connecting said clearance space and said portion of the groove.

2. Packing means for sealing between two members arranged one within the other with a working clearance space therebetween, one of said members having an annular groove presenting a wall at one of its ends, the packing means comprising a flexible sealing ring of substantially circular cross section arranged in said groove to seal with the other member, a backing ring of compressible material arranged in the groove between the sealing ring and said wall, the backing ring being adapted to be compressed axially by the sealing ring when the latter is crowded against it by fluid pressure entering the other end of the groove, and leakage path means for maintaining the fluid pressure in the portion of said groove adjacent the inner periphery of said wall in substantially balanced relation to the fluid pressure at the juncture of said wall and said clearance space to prevent extrusion of the backing ring into said clearance, said means including a ring arranged between said wall and backing ring and having substantially radial grooves for preserving communication between said space and said portion of the groove.

3. A piston for use in a cylinder comprising a piston body for operating in the cylinder and having an annular groove in its periphery, the groove having an end wall, there being clearance space between the periphery of the body and the wall of the cylinder, a flexible sealing ring of substantially circular cross section in the groove for sealing with the cylinder, a pliant backing ring in the groove between the sealing ring and said wall for preventing extrusion of the sealing ring into said clearance space when the fluid pressure forces the sealing toward said wall, and means for substantially balancing the fluid pressures at the inner and outer peripheries of the backing ring comprising a metal ring arranged in the groove between said wall and backing ring to have a surface opposing said wall, and radial grooves in said surface.

JAMES I. DETWEILER.

REFERENCES CITED

The following references are of record in the file of this patent:

UNITED STATES PATENTS

| Number | Name | Date |
|---|---|---|
| 859,329 | Mullen | July 9, 1907 |
| 891,519 | Ambrose | June 23, 1908 |
| 1,725,836 | Solberg | Aug. 27, 1929 |
| 1,773,363 | Kibele | Aug. 19, 1930 |
| 2,317,034 | Dalkin | Apr. 20, 1943 |
| 2,336,250 | Hein | Dec. 7, 1943 |
| 2,427,787 | Hunter | Sept. 23, 1947 |

FOREIGN PATENTS

| Number | Country | Date |
|---|---|---|
| 7,679 | Sweden | of 1897 |

OTHER REFERENCES

"Product of Engineering," March 1945, pp. 190 and 191.